(12) United States Patent
Kim et al.

(10) Patent No.: US 7,507,426 B2
(45) Date of Patent: Mar. 24, 2009

(54) UNIFIED POLARIZING PLATE AND METHOD FOR PREPARING THE SAME

(75) Inventors: Won-Kook Kim, Daejeon (KR); Sung-Ho Chun, Daejeon (KR); Sung-Cheol Yoon, Daejeon (KR); Tae-Sun Lim, Daejeon (KR); Heon Kim, Daejeon (KR); Jung-Min Lee, Daejeon (KR); Jeong-Su Yu, Daejeon (KR); In-Seok Hwang, Daejeon (KR); Beom-Seok Kim, Daejeon (KR)

(73) Assignee: LG Chem, Ltd. (KR)

( * ) Notice: Subject to any disclaimer, the term of this patent is extended or adjusted under 35 U.S.C. 154(b) by 202 days.

(21) Appl. No.: 10/507,425

(22) PCT Filed: Feb. 6, 2004

(86) PCT No.: PCT/KR2004/000226

§ 371 (c)(1), (2), (4) Date: Oct. 13, 2005

(87) PCT Pub. No.: WO2004/070463

PCT Pub. Date: Aug. 19, 2004

(65) Prior Publication Data

US 2006/0050388 A1 Mar. 9, 2006

(30) Foreign Application Priority Data

Feb. 6, 2003 (KR) .................. 10-2003-0007474

(51) Int. Cl.
G02F 1/13363 (2006.01)
(52) U.S. Cl. .................. 426/1.31; 428/1.5; 349/96; 349/118; 524/482; 524/553; 525/210
(58) Field of Classification Search .............. 428/1.31; 349/96, 117; 526/171; 536/59, 81; 203/30–34; 524/481–482, 553; 525/210
See application file for complete search history.

(56) References Cited

U.S. PATENT DOCUMENTS

| | | | |
|---|---|---|---|
| 5,344,916 A | 9/1994 | Harris et al. | 528/353 |
| 5,583,679 A | 12/1996 | Ito et al. | 349/118 |
| 5,705,503 A | 1/1998 | Goodall et al. | 526/281 |
| 6,726,995 B2 * | 4/2004 | Ishii et al. | 428/424.4 |
| 6,790,914 B2 * | 9/2004 | Kanamori et al. | 525/326.5 |
| 6,812,983 B2 * | 11/2004 | Arakawa | 349/117 |
| 6,965,474 B2 * | 11/2005 | Johnson et al. | 359/500 |
| 2001/0008920 A1 * | 7/2001 | Arakawa | 525/210 |
| 2002/0149725 A1 * | 10/2002 | Hashimoto | 349/117 |
| 2003/0063237 A1 * | 4/2003 | Okada et al. | 349/96 |
| 2003/0119961 A1 * | 6/2003 | Oshima et al. | 524/431 |
| 2003/0164920 A1 * | 9/2003 | Kelly et al. | 349/194 |
| 2004/0041968 A1 * | 3/2004 | Otoshi et al. | 349/117 |
| 2004/0106740 A1 * | 6/2004 | Kanamori et al. | 525/326.5 |
| 2004/0242823 A1 * | 12/2004 | Sekiguchi et al. | 526/279 |
| 2006/0055855 A1 * | 3/2006 | Duz et al. | 349/117 |
| 2006/0061717 A1 * | 3/2006 | Ichihashi | 349/117 |
| 2006/0105115 A1 * | 5/2006 | Kashima et al. | 428/1.1 |
| 2006/0106193 A1 * | 5/2006 | Moriyama et al. | 528/310 |

FOREIGN PATENT DOCUMENTS

| | | |
|---|---|---|
| CN | 1347939 A | 5/2002 |
| JP | 49-23828 B | 6/1974 |
| JP | 53-13223 B | 5/1978 |
| JP | 55-000734 | 1/1980 |
| JP | 57-18175 B | 4/1982 |
| JP | 59-14735 B | 4/1984 |
| JP | 5-230161 | 9/1993 |
| JP | 06-194646 | 7/1994 |
| JP | 07-077608 | 3/1995 |
| JP | 07-128659 | 5/1995 |
| JP | 07-287123 | 10/1995 |
| JP | 8-271731 | 10/1996 |
| JP | 2000-043202 | 2/2000 |
| JP | 2000-241627 | 9/2000 |
| JP | 2001-200065 | 7/2001 |
| JP | 2002-114826 | 4/2002 |
| JP | 2002-182036 | 6/2002 |
| JP | 2002-327024 | 11/2002 |
| JP | 2003-057439 | 2/2003 |
| KR | 1020010065713 | 7/2001 |
| KR | 2001-0075435 | 8/2001 |
| KR | 2002-0096349 | 12/2002 |
| WO | WO 01/05853 | 1/2001 |
| WO | WO 01/48519 | 5/2001 |
| WO | WO 01/37007 | 3/2003 |

OTHER PUBLICATIONS

"(n3-Ally) palladium (II) and Palladium (II) Nitrile Catalysts for the Addition Polymerization of Norbornene Derivatives with Functional Groups"; Authors: Risse et al, Macromolecules, 1996, vol. 29, 2755-2763.

"Transition-metal-catalyzed vinyl addition polymerizations of norbornene derivatives with ester groups"; Authors: Risse et al., Makromol. Chem. 1992, vol. 193, 2915-2927.

(Continued)

Primary Examiner—Keith D Hendricks
Assistant Examiner—Sophie Hon
(74) Attorney, Agent, or Firm—Cantor Colburn LLP

(57) ABSTRACT

The present invention relates to a unified polarizing plate, which employs, as a protection layer of a polarizing film, a transparent film that can simultaneously function as a negative C-plate and transparent protection layer of a polarizing film and has negative refractive index toward thickness direction, thereby simultaneously performing functions as a negative C-plate for optical compensation and as a polarizing plate, and a method for preparing the same. The unified polarizing plate has superior durability at high temperature and high humidity compared to those employing TAC as a protection layer, and improves wide view angle of liquid crystal display having positive refractive index toward thickness direction, when the liquid crystal display device is ON or OFF.

22 Claims, No Drawings

OTHER PUBLICATIONS

"Novel, Efficient, Palladium-Based System for the Polymerization of Norbornene Derivatives: Scope and Mechanism"; Authors: Sen et al., Organometallics 2001, vol. 20, 2802-2812.

"Three-Dimensional Dielectric Characterization of Polymer Films"; Authors: Patel, et al.; Journal of Applied Polymer Science: vol. 80; pp. 2328-2334; 2001.

* cited by examiner

UNIFIED POLARIZING PLATE AND METHOD FOR PREPARING THE SAME

BACKGROUND OF THE INVENTION (a) Field of the Invention

The present invention relates to a unified polarizing plate that simultaneously functions as a negative C-plate and a polarizing plate, and a method for preparing the same.

(b) Description of the Related Art

The present invention relates to a polarizing plate comprising a transparent protection layer, a polarizing film and a transparent protection layer, in which at least one of the transparent protection layer has negative refractive index toward thickness direction. More particularly, the present invention relates to a unified polarizing plate capable of simultaneously functioning as a negative C-plate and as a polarizing plate, and a method for preparing the same.

Recently, liquid crystal display shows a tendency to increase its area from small size mobile phone, notebook monitor to middle to large size display device of computer monitor and television. Particularly, in the case of middle to large size liquid crystal display, it is important to have clear definition at wide view angle and improve luminosity contrast at ON/OFF of the operation cell, for securing quality of competitive display.

For such reasons, displays of various liquid crystal cell modes, such as Dual Domain TN, ASM (Axially symmetric aligned microcell), VA (vertical alignment), SE (surrounding electrode), PVA (Patterned VA), IPS (In-Plane Switching) mode, and the like, are under development. These modes respectively have unique liquid crystal alignment and have unique optical anisotropy. Thus, in order to compensate change in optical axis of linearly polarized light due to optical anisotropy of these liquid crystal modes, compensation films of various optical anisotropies are required.

In order for optical compensation of liquid crystal displays of various modes, it is important to develop an optical film that can control optical anisotropy precisely and effectively. An optical anisotropy is divided into $R_e$, an in-plane phase difference value, and $R_{th}$, a phase difference value of in-plane fast axis (y-axis) and toward thickness direction (z-axis), as shown in the following equations 1 and 2.

$$R_{th} = \Delta(n_y - n_z) \times d \quad \text{[Equation 1]}$$

$$R_e = \Delta(n_x - n_y) \times d \quad \text{[Equation 2]}$$

wherein, $n_x$ is refractive index of in-plane slow axis (x-axis), $n_y$ is refractive index of in-plane fast axis (y-axis), and $n_z$ is refractive index toward thickness direction (z-axis), and d is thickness of a film.

In case one of $R_e$ or $R_{th}$ calculated by the above equations are much larger than the other, the film can be used as a compensation film having uniaxial optical anisotropy, and in case both are larger than 0 and similar to each other, the film can be used as a compensation film having biaxial optical anisotropy.

As the compensation film having uniaxial optical anisotropy, A-plate ($n_x \neq n_y \cong n_z$) and C-plate ($n_x \cong n_y \neq n_z$) can be exemplified. Considering compensation of optical axis polarized due to liquid crystal only, an ideal compensation film should have an optical axis that is mirror image of the optical axis of liquid crystal layer, and thus, in the case of liquid crystal display of VA mode or TN mode oriented such that refractive index toward thickness direction is larger than that toward in-plane direction, a negative C-plate having negative birefringence toward thickness direction is required.

Since the negative C-plate has very small $R_e$ value, $R_{th}$ can be calculated from the following equation 3 by measuring $R_\theta$, which is the product of the length of light progress route and refractive index difference $\Delta(n_y - n_\theta)$ (wherein $n_y$ is refractive index of fast axis and θ is an angle between normal to the surface of a film and incident light).

$$R_{th} = \frac{R_\theta \times \cos\theta_f}{\sin^2\theta_f} \quad \text{[Equation 3]}$$

wherein, $\theta_f$ is internal angle.

As a polymer material that can be used as such negative C-plate, discotic liquid crystal (U.S. Pat. No. 5,583,679) and polyimide having planar phenyl group in the main chain (U.S. Pat. No. 5,344,916), etc have been reported.

Since these materials have too large birefringence toward thickness direction and show light absorption at a visible ray, they cannot realize thickness of 30 to 150 μm that is suitable for a protection layer of a polarizing film. Thus, in case these materials are used for a protection layer of a polarizing film, precision coating thereof on a transparent protection layer is needed, which increases cost during coating process and causes non-uniformity of large phase difference even by slight difference in coating thickness due to comparatively large birefringence. Additionally, there is a problem of optical defect due to foreign substance such as dust remaining on the surface of coating film or existing in coating solution. Also, since materials comprising these aromatic compounds have large phase difference change rate according to wavelength, in case they are used for a protection film, compensation for wavelength dispersion due to them should also be considered.

Conventional polarizing plate consists of a polarizing film made of polyvinyl alcohol (PVA) and triacetate cellulose (TAC) protection layer that protects the polarizing film on both sides of the PVA polarizing film. Such polarizing plate is prepared by coating organic material such as discotic liquid crystal having negative birefringence toward thickness direction on a protection layer of the polarizing plate, or by laminating one or more films having slight birefringence toward thickness direction on a protection layer using an adhesive, in order for optical compensation toward thickness direction. Thus, its production process is complicated and is not favorable in terms of economy.

Additionally, although conventional TAC (triacetate cellulose) protection layer of polarizing plate has superior protection performance, it shows comparatively high moisture absorption, and thus there are problems of deterioration in polarizing degree and light leakage under high temperature high humidity conditions, and inferior durability.

Meanwhile, cyclic olefin copolymers are well known through literatures, and they have low dielectric constant due to high hydrocarbon content, and low hygroscopic property, are amorphous, and do not have light absorption at visible ray area due to π-conjugation, and thus have excellent light permeability. The cyclic monomers can be polymerized by ROMP (ring opening metathesis polymerization), HROMP (ring opening metathesis polymerization followed by hydrogenation), copolymerization with ethylene and homopolymerization, and the like, as shown in the following Reaction Formula 1. Wherein, in case the same kinds of monomers are polymerized using different polymerization methods, polymers having different structure are obtained, and their physical properties differ from each other.

[Reaction Formula 1]

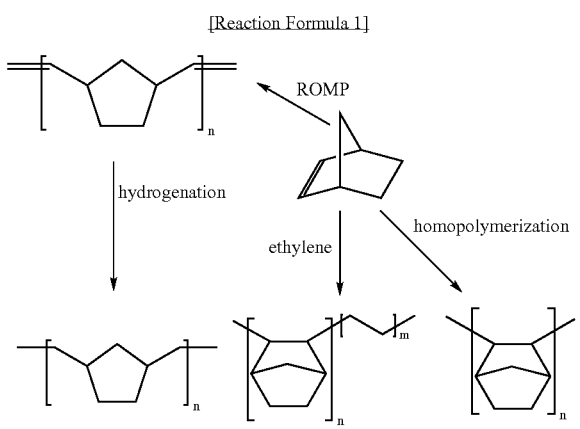

Cyclic olefin-based addition polymers obtained by addition polymerization using homogeneous catalyst, unlike polymers obtained by ROMP or copolymerization with ethylene, have rigid and bulky ring structure in three-dimensions in every monomer unit of the main chain. Thus, the conformational properties of polymer chains differ from those of polymers prepared by ROMP or copolymerization with ethylene, and they are amorphous polymers having comparatively higher glass transition temperature. Particularly, norbornene-based polymers having comparatively large molecular weight obtained by addition polymerization using an organic metal compound as a catalyst are mostly polymers of non-polar alkyl norbornene or copolymers with olefin, or comprise tri-ethoxy silyl norbornene having weak polarity as monomers, and they have low dielectric constant and excellent electrical anisotropy (J. Appl. Polym. Sci. Vol 80, p 2328, 2001).

Introduction of substituent groups into a polymer consisting of hydrocarbon is useful for controlling chemical and physical properties of polymer. However, since free electron pair at such substituent group often reacts with activated catalyst site to act as a poison of a catalyst, it is not easy to introduce substituent group into a polymer. In case cyclic monomers having substituent groups are polymerized, the obtained polymer has low molecular weight. Generally, norbornene-based polymers are polymerized using transition organic metal catalyst, most of which show low activity for polymerizing monomers comprising polar groups such as ester or acetate group, and the produced polymer has a molecular weight of 10,000 or less (Risse et al., Macromolecules, 1996, Vol. 29, 2755-2763; Risse et al., Makromol. Chem. 1992, Vol. 193, 2915-2927; Sen et al., Organometallics 2001, Vol 20, 2802-2812, Goodall et al., U.S. Pat. No. 5,705,503).

SUMMARY OF THE INVENTION

It is an object of the present invention to provide a unified polarizing plate simultaneously performing functions as a negative C-plate for optical compensation and as a polarizing plate, employing a polynorbornene based transparent film having negative birefringence toward thickness direction that can simultaneously function as a negative C-plate and as a transparent protection film of polarizing film.

It is another object of the present invention to provide a unified polarizing plate wherein on at least one side of a polarizing film, a transparent film comprising cyclic olefin-based addition polymer that has negative birefringence toward thickness direction and shows little change in birefringence according to wavelength is laminated as an optical compensation/protection film, and a method for preparing the same. The "optical compensation/protection film" herein means a film that is employed for a protection film of a polarizing film, and has $R_{th}$ of 60~1000 nm at a thickness of 30~200 μm, within which range the film has negative birefringence, and more preferably, $R_{th}$ of 100~600 nm at a thickness of 50~150 μm.

It is still another object of the present invention to provide unified polarizing plate employing as a protection layer of a polarizing film, a transparent film that can control birefringence toward thickness direction by controlling the kinds and contents of functional groups introduced into cyclic olefin monomer, and a method for preparing the same.

It is still another object of the present invention to provide a polarizing plate employing as a protection layer of a polarizing film a transparent film that comprises cyclic olefin-based addition polymer and has excellent absorption resistance, and a method for preparing the same.

It is still another object of the present invention to provide a liquid crystal display comprising a unified polarizing plate comprising a compensation/protection film comprising cyclic olefin-based addition polymer having negative birefringence toward thickness direction.

DETAILED DESCRIPTION OF THE PREFERRED EMBODIMENTS

In order to achieve these objects, the present invention provide a polarizing plate comprising
 a) a polarizing film; and
 b) a protection layer of a transparent film comprising cyclic olefin-based addition polymer.

The present invention also provides a unified polarizing plate wherein on at least one side of a polarizing film, an optically anisotropic transparent film, which has retardation value ($R_{th}$) of 60 to 1000 nm, calculated by the following equation 1, and has phase difference ratio ($R_{450}/R_{550}$) of 1 to 1.05 and phase difference ratio ($R_{650}/R_{550}$) of 0.95 to 1, is laminated (wherein $R_{450}$ is phase difference at a wavelength of 450 nm, and $R_{550}$ is phase difference at a wavelength of 550 nm, and $R_{650}$ is phase difference at a wavelength of 650 nm):

$$R_{th}=\Delta(n_y-n_z)\times d \quad \text{[Equation 1]}$$

wherein $n_y$ is refractive index of in-plane fast axis, measured at a wavelength of 550 nm, $n_z$ is refractive index toward thickness direction, measured at a wavelength of 550 nm, and d is a thickness of a film.

The present invention also provides a method for preparing a polarizing plate having negative refractive index toward thickness direction, comprising the steps of:

a) conducting addition polymerization of norbornene-based monomers to prepare norbornene addition polymer;

b) dissolving the norbornen-based addition polymer in a solvent- to prepare norbornen-based addition polymer solution;

c) coating or casting the norbornen-based addition polymer solution on a hard surface and drying; and d) laminating the cast film on a polarizing film.

The present invention also provides a liquid crystal display comprising a unified polarizing plate comprising a negative C-plate type optically anisotropic film comprising cyclic olefin-based addition polymer as a protection layer.

The present invention will now be explained in more detail.

The inventors have discovered that a conformational unit of cyclic olefin is rigid and bulky and thus constitutes an extended conformation, thereby having anisotropy in single molecule, and that if a polar group is introduced into norbornene-based polymer having such extended conformation, intermolecular interaction increases compared to polymers having compact conformation, thereby having directional order to intermolecular packing, and having optical and electric anisotropy. Also, they have discovered that a film comprising the cyclic olefin addition polymer has phase difference $R_{th}$ toward thickness of 60~1000 nm at a thickness of 30 to 200 µm, within which range a film can be used as a protection layer of a polarizing film, and more preferably $R_{th}$ of 100~600 nm at a wavelength of 50 to 150 µm, and it shows little change according to wavelength, and that such a film having negative birefringence toward thickness has low moisture absorption and superior adhesion to PVA, and thus when employed as a protection layer of a polarizing film, it offers superior durability.

In order for optical compensation toward thickness direction, the present invention provides a unified polarizing plate employing as a protection layer a cyclic olefin-based compensation/protection film having negative birefringence toward thickness direction on at least one side of a polarizing film. The unified polarizing plate is different from conventional polarizing plate comprising a protection film, polarizing film, and another protection film. To compensate the light leakage at wide view angle of a liquid crystal display device which has a positive birefringence when the power is ON or OFF, the conventional polarizing plate needs additional articles like an organic substance coating layer such as discotic liquid crystal having negative birefringence toward thickness direction, or one or more stretched or unstretched films having slight negative birefringence toward thickness direction which can be laminated on a protection layer employing an adhesive. However, unified polarizing plate does not need additional article of negative C-plate for compensation at wide view angle, since the cyclic olefin based compensation/protection film has a relatively high negative retardation value toward thickness direction.

The "compensation/protection film" herein means a film that can be used as a negative C-plate with a thickness of 30 to 200 µm, preferably 50 to 150 µm, having negative birefringence toward thickness direction, as a protection layer of a PVA polarizing film, and the "unified polarizing plate" means a polarizing plate wherein the compensation/protection film is laminated on at least one side of a PVA polarizing film.

For this, the present invention provides a unified polarizing plate employing an anisotropic film of a negative C-plate type as a protection layer. Particularly, the present invention provides a unified polarizing plate employing a film comprising cyclic olefin addition polymer that is obtained by addition polymerization of norbornene-based monomers, on at least one side of a polarizing film as a protection layer, and a method for preparing the same, and a liquid crystal display comprising the same.

The cyclic olefin-based addition polymer prepared by addition polymerization of norbornene-based monomers includes polymers prepared by addition polymerization of monomers of the following Chemical Formula 1 alone or in combination of two or more kinds:

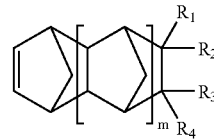

[Chemical Formula 1]

wherein, m is an integer of 0 to 4, $R_1$, $R_2$, $R_3$, and $R_4$ are independently or simultaneously, a hydrogen; halogen; straight or branched alkyl, alkenyl or vinyl having 1 to 20 carbon atoms; cycloalkyl having 4 to 12 carbon atoms, substituted or unsubstituted with hydrocarbon; aryl having 6 to 40 carbon atoms, substituted or unsubstituted with hydrocarbon; aralkyl having 7 to 15 carbon atoms, substituted or unsubstituted with hydrocarbon; alkynyl having 3 to 20 carbon atoms; or a polar functional group selected from the group consisting of straight or branched haloalkyl, haloalkenyl or halovinyl having 1 to 20 carbon atoms; halocycloalkyl having 4 to 12 carbon atoms, substituted or unsubstituted with hydrocarbon; haloaryl having 6 to 40 carbon atoms, substituted or unsubstituted with hydrocarbon; haloaralkyl having 7 to 15 carbon atoms, substituted or unsubstituted with hydrocarbon; haloalkynyl having 3 to 20 carbon atoms; and non-hydrocarbonaceous polar group comprising at least one of oxygen, nitrogen, phosphor, sulfur, silicon, or boron, when $R_1$, $R_2$, $R_3$ and $R_4$ are not hydrogen, halogen or polar functional group, $R_1$ and $R_2$ or $R_3$ and $R_4$ may be connected with each other to form an alkylidene group having 1 to 10 carbon atoms, or $R_1$ or $R_2$ may be connected with one of $R_3$ and $R_4$ to form a saturated or unsaturated cyclic group having 4 to 12 carbon atoms, or aromatic cyclic compound having 6 to 24 carbon atoms.

The non-hydrocarbonaceous polar group of the above Chemical Formula 1 is preferably selected from the group consisting of:

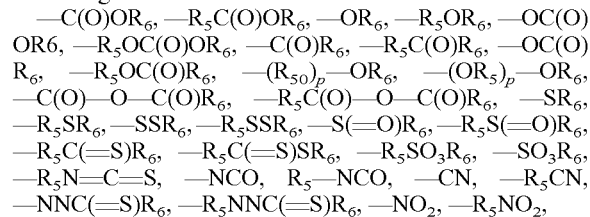

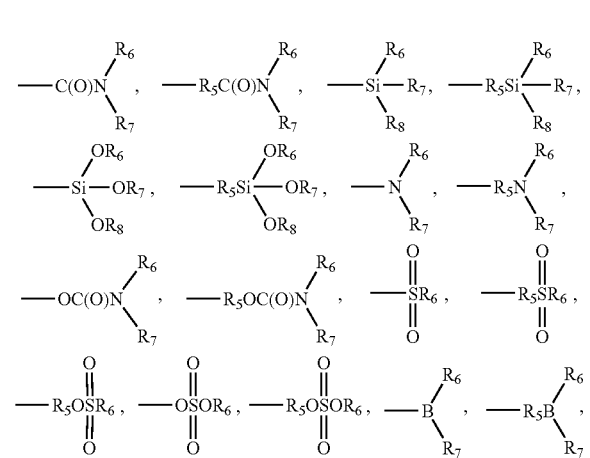

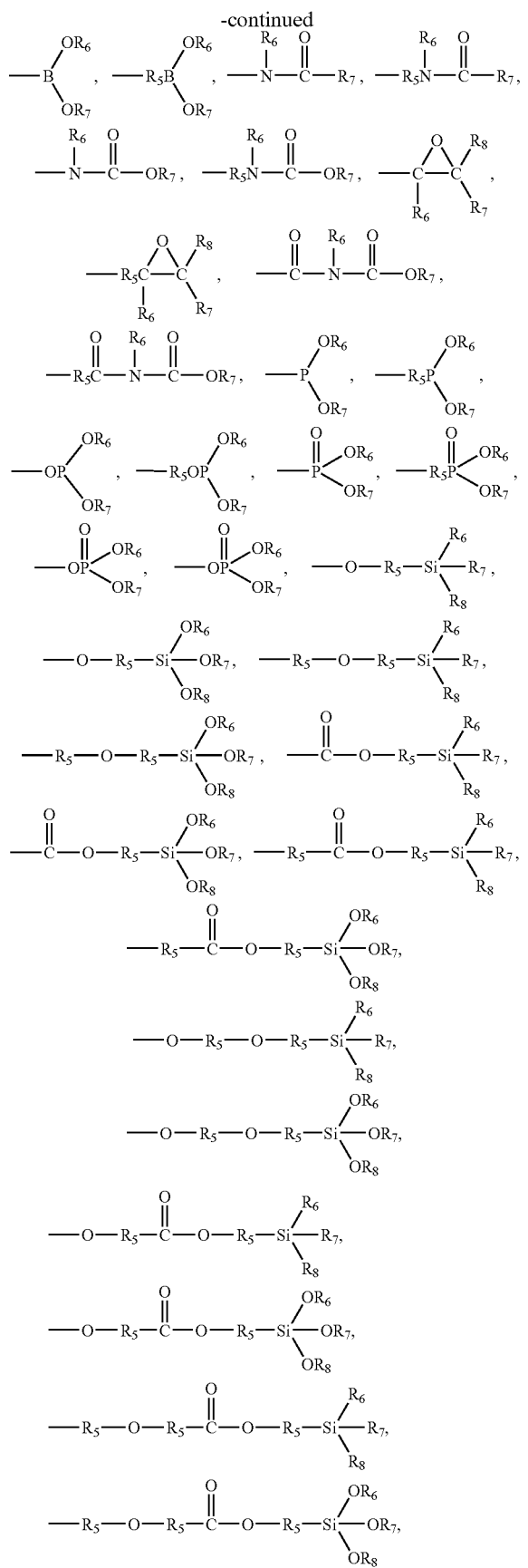
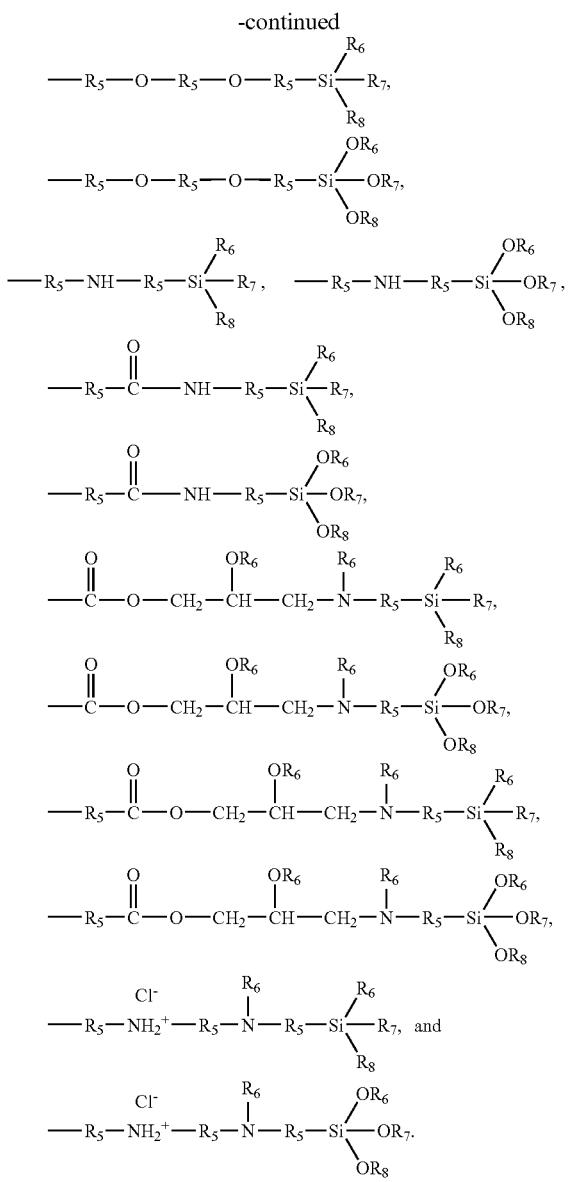

wherein each $R_5$ is a straight or branched alkyl, haloalkyl, alkenyl, haloalkenyl, vinyl, halovinyl having 1 to 20 carbon atoms; cycloalkyl or halocycloalkyl having 4 to 12 carbon atoms, substituted or unsubstituted with hydrocarbon; aryl or haloaryl having 6 to 40 carbon atoms, substituted or unsubstituted with hydrocarbon; aralkyl or haloaralkyl having 7 to 15 carbon atoms, substituted or unsubstituted with hydrocarbon; or, alkynyl or haloalkynyl having 3 to 20 carbon atoms, each of $R_6$, $R_7$ and $R_8$ is a hydrogen; halogen; straight or branched alkyl, haloalkyl, alkenyl, haloalkenyl, vinyl, halovinyl, alkoxy, haloalkoxy, carbonyloxy, halocarbonyloxy having 1 to 20 carbon atoms; cycloalkyl or halocycoalkyl having 4 to 12 carbon atoms, substituted or unsubstituted with hydrocarbon; aryl, haloaryl, aryloxy, or haloaryloxy having 6 to 40 carbon atoms, substituted or unsubstituted with hydrocarbon; aralkyl or haloaralkyl having 7 to 15 carbon atoms, substituted or unsubstituted with hydrocarbon; alkynyl or haloalkynyl having 3 to 20 carbon atoms, and p is an integer of 1 to 10.

The "norbornene-based monomer" herein means a monomer comprising at least one norbornene(bicyclo[2,2,1]hept-2-ene) unit of the following Chemical Formula 2.

[Chemical Formula 2]

As the norbornene-based addition polymer, which is a material of the optically anisotropic film of negative C-plate type of the present invention, any cyclic olefin-based polymers prepared by addition polymerization of norbornene-based monomers can be used, and various cyclic olefin polymers can be used depending on a catalyst system employed during addition polymerization. The addition polymers include: a homopolymer of norbornen-based monomers comprising non-polar functional group, a copolymer of norbornene-based monomers comprising different kinds of non-polar functional groups, a homopolymer of norbornene-based monomers comprising polar functional group, a copolymer of norbornene-based monomers comprising different kinds of polar functional groups, and a copolymer of norbornene-based monomers comprising non-polar functional group and norbornene-based monomers comprising polar functional group. It is preferable to use norbornene-based polymer having polar group with a number average molecular weight of 10,000 or more. The addition polymerization is carried out by a common polymerization method, by mixing monomers to be polymerized and a catalyst in a solvent.

The polar groups introduced into the cyclic olefin-based addition polymer, although they can be chosen depending on a specific catalyst system, are not specifically limited. And, polymer capable of controlling optical anisotropy can be prepared while the kinds and contents of the polar functional group or non-polar functional group are varied, and such a polymer can be used as a compensation/protection film that can be used for optical compensation toward thickness direction of LCD and as a protection layer of a PVA polarizing film.

The cyclic olefin-based addition polymer into which the polar group is introduced can be prepared by various methods, and preferably prepared by addition polymerization of norbornene-based monomers in the presence of Group 10 transition metal catalyst.

More preferably, a cyclic olefin-based polymer into which a polar group is introduced is prepared with high yield and high molecular weight, by a method comprising the step of contacting the norbornene-based monomers of the above Chemical Formula 1 with a catalyst component of a catalyst system which comprises a catalyst component of Group 10 transition metal compound, a cocatalyst component of an organic compound that comprises Group 15 element and has noncovalent electron pair capable of functioning as an electron donor, and a cocatalyst component of a salt comprising Group 13 element capable of offering an anion that can be weakly coordinated to the transition metal, thereby effecting an addition polymerization.

Additionally, a cyclic olefin-based polymer comprising a polar group of ester or acetyl group is preferably prepared by a method comprising contacting norbornene-based monomers comprising a polar group of ester or acetyl group selected from the norbornene-based monomers of the above Chemical Formula 1 with a catalyst component of a catalyst system which comprises i) Group 10 transition metal compound;

ii) a compound having a cone angle of at least 160° and comprising neutral Group 15 electron donor ligand; and iii) a salt capable of offering an anion that can be weakly coordinated to the i) transition metal. However, a cyclic olefin-based polymer comprising a polar group and its preparation method are not limited to the above.

The i) Group 10 transition metal is preferably a compound represented by the following Chemical Formula 3, or a compound represented by the following Chemical Formula 4:

M(R)(R')      [Chemical Formula 3]

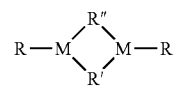

[Chemical Formula 4]

wherein,

M is Group 10 metal,

R and R' are leaving groups of an anion that can be easily left by a weakly coordinating anion, and are selected from the group consisting of hydrocarbyl, halogen, nitrate, acetate, trifluoromethanesulfonate, bistrifluoromethanesulfonimide, tosylate, carboxylate, acetylacetonate, carbonate, aluminate, borate, antimonite such as $SbF_6-$, arsenate such as $AsF_6-$, phosphate such as $PF_6-$ or $PO_4-$, perchlorate such as $ClO_4-$, amide such as $(R'')_2N$, and phosphide such as $(R'')_2P$, Wherein the hydrocarbyl anion is selected from the group consisting of: hydride; straight or branched alkyl, haloalkyl, alkenyl, haloalkenyl, vinyl or halovinyl having 1 to 20 carbon atoms; cycloalkyl or halocycloalkyl having 4 to 12 carbon atoms, substituted or unsubstituted with hydrocarbon; aryl or haloaryl having 6 to 40 carbon atoms, substituted or unsubstituted with hydrocarbon; aryl or haloaryl having 6 to 40 carbon atoms comprising hetero atom; aralkyl or haloaralkyl having 7 to 15 carbon atoms, substituted or unsubstituted with hydrocarbon; and alkynyl or haoalkynyl having 3 to 20 carbon atoms, the acetate anion is an anion ligand offering σ bond such as [R"C(O)O]⁻ and the acetylacetonate anion is an anion ligand offering π bond such as [R"C(O)CHC(O)R""]⁻, and R", R''' and R"" are respectively a hydrogen; halogen; straight or branched alkyl, haloalkyl, alkenyl, haloalkenyl, vinyl or halovinyl having 1 to 20 carbon atoms; cycloalkyl or halocycloalkyl having 4 to 12 carbon atoms, substituted or unsubstituted with hydrocarbon; aryl or haloaryl having 6 to 40 carbon atoms, substituted or unsubstituted with hydrocarbon; aryl or haloaryl having 6 to 40 carbon atoms comprising hetero atom; aralkyl or haloaralkyl having 7 to 15 carbon atoms, substituted or unsubstituted with hydrocarbon; or alkynyl or haloalkynyl having 3 to 20 carbon atoms.

The ii) compound having a cone angle of at least 160° and comprising neutral Group 15 electron donor ligand is preferably a compound represented by the following Chemical Formula 5 or a compound represented by the following Chemical Formula 6.

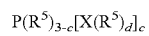

$P(R^5)_{3-c}[X(R^5)_d]_c$      [Chemical Formula 5]

Wherein,

X is an oxygen, a sulfur, a silicon, or a nitrogen;

c is an integer of 0 to 3; when X is an oxygen or a sulfur, d is 1, when X is a silicon, d is 3, and when X is a nitrogen, d is 2;

when c is 3 and X is an oxygen, 2 or 3 $R^5$s may be connected each other together with an oxygen to form a cyclic group; and, when c is 0, 2 $R^5$s may be connected each other to form a phosphacycle;

$R^5$ is a hydrogen; straight or branched alkyl, alkoxy, allyl, alkenyl or vinyl having 1 to 20 carbon atoms; cycloalkyl having 4 to 12 carbon atoms, substituted or unsubstituted with hydrocarbon; aryl having 6 to 40 carbon atoms, substituted or unsubstituted with hydrocarbon; aralkyl having 7 to 15 carbon atoms, substituted or unsubstituted with hydrocarbon; alkynyl having 3 to 20 carbon atoms; tri(C1-10 linear or branched alkyl)silyl, tri(C1-10 linear or branched alkoxy)silyl; tri(C5-12 cycloalkyl substituted or unsubstituted with hydrocarbon)silyl; tri(C6-40 aryl substituted or unsubstituted with hydrocarbon)silyl; tri(C6-40 aryloxy substituted or unsubstituted with hydrocarbon)silyl; tri(C1-10 linear or branched alkyl)silyl; tri(C4-12 cycloalkyl substituted or unsubstituted with hydrocarbon); or tri(C6-40 aryl substituted or unsubstituted with hydrocarbon), each of which may be substituted with linear or branched haloalkyl or halogen, $(R^5)_2P—(R^6)—P(R^5)_2$     [Chemical Formula 6]

wherein $R^5$ is as defined in the Chemical Formula 5, $R^6$ is linear or branched alkyl, alkenyl or vinyl having 1 to 5 carbon atoms; cycloalkyl having 4 to 12 carbon atoms, substituted or unsubstituted with hydrocarbon; aryl having 6 to 20 carbon atoms, substituted or unsubstituted with hydrocarbon; or aralkyl having 7 to 15 carbon atoms, substituted or unsubstituted with hydrocarbon.

The iii) salt capable of offering an anion that can be weakly coordinated to the i) transition metal is preferably represented by the following Chemical Formula 7:

$[Cat]_a[Anion]_b$     [Chemical Formula 7]

wherein

Cat is a hydrogen; a cation of Group I metal, Group II metal, or transition metal; or a cation selected from organic groups comprising these cations, to which the ii) weakly coordinating neutral Group XV electron donor compound can be bonded;

Anion is an anion that can be weakly coordinated to the metal M of the compound of the above Chemical Formula 3, and is selected from the group consisting of borate, aluminate, $SbF_6^-$, $PF_6^-$, $AlF_3O_3SCF_3^-$, $SbF_5SO_3F^-$, $AsF_6^-$, perfluoroacetate ($CF_3CO_2^-$), perfluoropropionate ($C_2F_5CO_2^-$), perfluorobutyrate ($CF_3CF_2CF_2CO_2^-$), perchlorate ($ClO_4^-$), para-toluenesulfonate (p-$CH_3C_6H_4SO_3^-$), $SO_3CH_3^-$, boratabenzene, and carborane substituted or unsubstituted with halogen;

a and b respectively indicate the number of cations and anions, and these are determined so as to be electrically neutral.

The organic group comprising the cation of the Chemical Formula 7 is preferably selected from the group consisting of ammonium such as $[NH(R^7)_3]^+$, or $[N(R^7)_4]^+$; phosphonium such as $[PH(R^7)_3]^+$, or $[P(R^7)_4]^+$; carbonium such as $[C(R^7)_3]^+$; silylium such as $[Si(R^7)_3]^+$; $[Ag]^+$; $[Cp_2Fe]^+$; and $[H(OEt_2)_2]^+$. Wherein, R7 is linear or branched alkyl, alkyl substituted with halogen, or silyl alkyl, each having 1 to 20 carbon atoms; cycloalkyl having 4 to 12 carbon atoms substituted or unsubstituted with hydrocarbon; cycloalkyl or silyl cycloalkyl substituted with halogen; aryl having 6 to 40 carbon atoms, substituted or unsubstituted with hydrocarbon; aralkyl having 7 to 15 carbon atoms, substituted or unsubstituted with hydrocarbon; or aralkyl or silyl aralkyl substituted or unsubstituted with halogen.

The borate or aluminate of the Chemical Formula 3, 4 and 7 is preferably an anion represented by the following Chemical Formula 8 or 9:

$[M'(R^8)(R^9)(R^{10})(R^{11})]$     [Chemical Formula 8]

$[M'(OR^{12})(OR^{13})(OR^{14})(OR^{15})]$     [Chemical Formula 9]

wherein, M' is boron or aluminum, $R^8$, $R^9$, $R^{10}$, $R^{11}$, $R^{12}$, $R^{13}$, $R^{14}$, and $R^{15}$ are halogen; linear or branched alkyl or alkenyl having 1 to 20 carbon atoms, substituted or unsubstituted with halogen; cycloalkyl having 4 to 12 carbon atoms, substituted or unsubstituted with hydrocarbon; aryl having 6 to 40 carbon atoms, substituted or unsubstituted with hydrocarbon; aralkyl having 7 to 15 carbon atoms, substituted or unsubstituted with hydrocarbon; linear or branched trialkylsiloxy having 3 to 20 carbon atoms; or linear or branched triarylsiloxy having 18 to 48 carbon atoms.

The catalyst system can avoid decrease in catalyst activity due to ester or acetyl group of endo-isomer by introducing suitable ligand and thus has high activity, and it enables easy preparation of cyclic olefin-based addition polymer comprising a polar group of ester or acetyl group.

The cyclic olefin-based addition polymer used for preparing the compensation/protection film of negative C-plate of a unified polarizing film of the present invention does not show light loss due to light absorption in visible light region, shows comparatively low moisture absorption, and if a polar functional group is introduced, it has higher surface tension compared to the case where only non-polar functional groups exist, and it also has excellent adhesion to polyvinylalcohol (PVA) film.

The optical anisotropic film of the present invention, in order to increase negative birefringence toward thickness direction, preferably introduces ester or acetyl group into norbornene-based monomers of the Chemical Formula 1, and other functional groups including alkoxy, amino, hydroxyl and carbonyl group, and halogen atom can also be introduced. However, the functional groups are not limited to the above. As shown in the following Examples, refractive index and $R_{th}$ value can be controlled by varying the kinds and contents of the substituent groups introduced into norbornene.

Generally, in order to obtain high $R_{th}$, a cyclic olefin having large m in the above Chemical Formula 1 is introduced, the contents of polar functional groups increase, the length of the substituent group decreases by decreasing the number of carbons existing in $R_1$, $R_2$, $R_3$, $R_4$ and $R_5$, which determines the length of the substituent group of norbornene-based monomer, a functional group having high polarity is introduced, or, a cyclic olefin wherein $R_1$ or $R_2$ is connected to one of $R_3$ and $R_4$ to form an aromatic cyclic compound having 6 to 24 carbon atoms.

The compensation/protection film of negative C-plate employed in the unified polarizing plate of the present invention is prepared in the form of film or sheet by dissolving the above-explained cyclic olefin-based addition polymer in a solvent and carrying out solution casting.

The film is prepared from a homopolymer of norbornene-based monomers comprising non-polar functional group, a copolymer of norbornene-based monomers comprising different kinds of non-polar functional group, a homopolymer of norbornene-based monomers comprising a polar functional group, a copolymer of norbornene-based monomers comprising different kinds of polar functional groups, or a copolymer of norbornen-based monomers comprising non-polar functional group and norbornene-based monomers comprising polar functional group. And, the film can also be prepared from a blend of one or more kinds of the cyclic olefin polymers.

As the organic solvent employed for solution casting, those which dissolve cyclic olefin-based addition polymer and show appropriate viscosity are preferred, and more preferably, ether having 3 to 12 carbon atoms, ketone having 3 to 12 carbon atoms, ester having 3 to 12 carbon atoms, halogenated hydrocarbon having 1 to 6 carbon atoms, aromatic compounds, or the mixture thereof is selected. The ether, ketone and ester compound may have ring structure. And, compounds having 2 or more ether, ketone or ester functional group can be used, and compounds having one or more functional groups together with halogen atom can also be used.

The examples of the ether having 3 to 12 carbon atoms include diisopropylether, dimethoxymethane, tetrahydrofuran, and the like, and the examples of the ester having 3 to 12 carbon atoms include ethyl formate, propyl formate, pentyl formate, methyl acetate, ethyl acetate, propyl acetate, isopropyl acetate, isobutyl acetate, pentyl acetate and the like. The halogenated hydrocarbon preferably has 1 to 4 carbon atoms, more preferably one carbon atoms, the preferred halogen atoms is chlorine, and its representative examples include methylene chloride. The examples of aromatic compounds include benzene, toluene and chlorobenzene, and the like.

In order to prepare a film by solution casting, it is preferable to introduce cyclic olefin-based addition polymer in a solvent in an amount of 5 to 95 wt %, more preferably 10 to 60 wt %, and stirring the mixture at room temperature. The viscosity of the prepared solution is preferably 100 to 50000 cps, more preferably 500 to 20000 cps for solution casting. In order to improve mechanical strength, heat resistance, light resistance, and manipulability of the film, additives such as plasticizer, anti-deterioration agent, UV stabilizer and antistatic agent can be added.

As the plasticizer, carboxylic ester or phosphate ester can be used. The examples of the carboxylic ester include dimethyl phthalate (DMP), diethylphthalate (DEP), dibutylphthalate (DBP), dioctyl phthalate (DOP), diphenylphthalate (DPP), diethylhexyl phthalate (DEHP), and the like, and the example of the phosphate ester include triphenyl phosphate (TPP), tricresyl phosphate (TCP), and the like. If the contents of the lower molecular plasticizer are excessive, durability of the film may deteriorate due to diffusion on the film surface, and thus suitable contents, for example, 0.1 to 20 wt % are preferable. And, it is preferable to increase the content of the plasticizer as the glass transition temperature of the cyclic olefin-based addition polymer increases.

As the anti-deterioration agent, phenol derivatives or aromatic amine is preferable, and the contents are determined within the range that does not deteriorate optical and mechanical properties, and durability of the film.

The examples of the phenol-based anti-deterioration agent include octadecyl-3-(4-hydroxy-3,5-di-tert-butylphenyl)propionate (Ciga-Geigy Company, Irganox 1076), tetrabis[methylene-3-(3,5-di-tert-butyl-4-hydroxyphenyl)propionate] methane (Ciba-Geigy Company, Irganox 1010), 1,3,5-trimethyl-2,4,6-tris-(3,5-di-t-butyl-4-hydroxybenzyl) benzene (Ciba-Geigy Company, Irganox 1330), tris-(3,5-di-t-butyl-4-hydroxybenzyl)isoamine (Ciba-Geigy Company, Irganox 3114), and the like.

The examples of the aromatic amine type anti-deterioration agent include phenyl-α-naphtylamine, phenyl-β-naphtylamine, N,N'-diphenyl-p-phenylenediamine, N,N'-di-β-naphtyl-p-phenylenediamine, and the like.

The anti-deterioration agent can be used together with peroxide disintegrating agent of phosphite or sulfide compound. The examples of the phosphite type peroxide disintegrating agent include tris(2,4-di-t-butylphenyl)phosphite (Ciba-Geigy Company, Irgafos 168) and the like, the examples of the sulfide type disintegrating agent include dilauryl sulfide, dilauryl thiodipropionate, distearyl thiodipropionate, mercaptobenzothioazole, tetramethylthiurain disulfide, and the like.

As the UV stabilizer, benzophenone, salicylic acid or benzotriazole-based UV stabilizer is preferred. The examples of the benzophenone-based UV stabilizer include 2-hydroxy-4-octoxybenzophenone, 2,2'-dihydroxy-4,4'-dioctoxy benzophenone and the like, and the examples of the salicylic acid based UV stabilizer include p-octyl phenyl salicylate and the like, and the examples of the benzotriazole based UV stabilizer include 2-(2'-hydroxy-5'-methylphenyl and the like.

As the antistatic agent, those which can be mixed with polynorbornene solution can be used, and those having surface specific resistance of $10^{10} \Omega$ or less are preferred. The examples of the antistatic agent include non-ionic, anionic or cationic antistatic agent.

The non-ionic antistatic agent includes polyoxyethylene alkyl ether, polyoxyethylene alkyl phenol ether, polyoxyethylene alkyl ester, polyoxyethylene stearyl amine, polyoxyethylene alkyl amine and the like.

The anionic antistatic agent includes sulfate ester salts, alkyl allyl sulfonate salts, aliphatic amide sulfonate salts, phosphate ester salts and the like.

The cationic antistatic agent includes aliphatic amine salts, alkyl pyridinium salts, imidazolin derivatives, betaine type higher alkyl amino derivatives, sulfate ester derivatives, phosphate ester derivatives and the like.

Additionally, ionic polymers can also be used, and as examples, anionic polymer compounds disclosed in Japanese Laid-Open Patent Publication No. 49-23828, ionene type compounds having dissociation groups in a ring disclosed in Japanese Laid-Open Patent Publication No. 55-734, Japanese Laid-Open Patent Publication No. 59-14735 and Japanese Laid-Open Patent Publication No. 57-18175, cationic polymer compounds disclosed in Japanese Laid-Open Patent Publication No. 53-13223, and graft copolymer disclosed in Japanese Laid-Open Patent Publication No. 5-230161 can be used as an antistatic agent.

The cyclic olefin-based addition polymer solution is casted or coated on a band or drum, or a glass plate that has a polished hard surface, and the solvent is dried to obtain an optical film or sheet. Temperature for drying the solvent can be selected depending on the kinds of the employed solvent. The metal or glass substrate that has a polished hard surface has preferably surface temperature of room temperature or less. After sufficiently drying the solvent, the formed film or sheet is exfoliated from the metal (steel) or glass.

The prepared optical film of cyclic olefin-based addition polymer of the present invention is an optical anisotropic transparent film having retardation value ($R_{th}$) of 60 to 800 nm, calculated from the following equation 1.

$$R_{th} = \Delta(n_y - n_z) \times d \qquad \text{[Equation 1]}$$

wherein, $n_y$ is refractive index of in-plane fast axis, measured at a wavelength of 550 nm, $n_z$ is refractive index toward thickness direction (z-axis), measured at a wavelength of 550 nm, and d is a thickness of a film.

Particularly, when the thickness of the film is set to 30 to 200 μm, the film can have $R_{th}$ of 60 to 1000 nm, and when the thickness of the film is set to 50 to 150 μn, the film can have $R_{th}$ of 100 to 600 nm. The film has excellent transparency, and thus has light permeability of 90% or more at 400 to 800 nm, and shows flat wavelength dispersion property in that phase difference ratios at two wavelengths observed at a specific inclination angle of ($R_{450}/R_{550}$) and ($R_{650}/R_{550}$) respectively are 1.05 or less and 0.95 or more. Wherein $R_{450}$ is phase difference value at a wavelength of 450 nm, $R_{550}$ is phase difference value at a wavelength of 550 nm, and $R_{650}$ is phase difference value at a wavelength of 650 nm. Such flat wavelength dispersion property can be varied by blending or introduction of functional groups into polymers, if necessary. Practically, phase difference ratio at two wavelengths of ($R_{450}/R_{550}$) is 1 to 1.05, and ($R_{650}/R_{550}$) is 0.95 to 1.

The optical film of cyclic olefin-based addition polymer of the present invention has excellent adhesion property while having optical anisotropy, and thus can be adhered to polyvinylalcohol (PVA) polarizing film. And, if necessary, before adhesion of the film, a surface treatment selected from the group consisting of corona discharge, glow discharge, flame treatment, acid treatment, alkali treatment, UV irradiation, and coating can be conducted on the film.

When the polarizing plate wherein the optical anisotropic film of cyclic olefin-based addition polymer is laminated as a protection layer of a polarizing film is comprised in a liquid crystal display, the display has clear definition at wide view angle, luminosity contrast at ON/OFF of the operation cell can be improved, and a liquid crystal display of liquid crystal mode satisfying $n_x \cong n_y < n_z$ (wherein $n_x$ is refractive index of in-plane slow axis, $n_y$ is refractive index of fast axis, and $n_z$ is refractive index toward thickness direction) when power is ON or OFF can be realized.

The polarizing film employed in the present invention is preferably prepared by dyeing PVA film with iodine or bi-color pigment, but its preparation method is not specifically limited.

The unified polarizing plate of the present invention can be prepared by laminating a compensation/protection film prepared from cyclic olefin-based addition polymer having negative birefringence toward thickness direction on at least one side of a polarizing film. As a protection layer of the other side of the polarizing film, any transparent optical film comprising a film prepared from cyclic olefin-based addition polymer can be used. Since the lamination of the cyclic olefin-based negative C-plate of the present invention as a protection layer causes little phase difference, a continuous process of roll-to-roll lamination can be employed. The lamination to the polarizing film can be carried out using an adhesive, and the examples of the adhesive include PVA adhesive aqueous solution, polyurethane-based adhesive, epoxy-based adhesive, styrene-based adhesive and hot-melt type adhesive.

In case a PVA adhesive is used, the cyclic olefin-based compensation/protection film is surface treated (for example, corona discharge, plasma treatment, ion beam treatment, and the like), and then, it is coated using a roll coater, bar coater, knife coater or capillary coater, and before completely dried, compressed under heating or room temperature using two rolls and thus laminated.

In case a polyurethane-based adhesive is used, it is preferable to employ aliphatic isocyanate that does not show yellowing due to light exposure. And, a mono-liquid type or bi-liquid type adhesive for dry lamination can also be used, and in case reactivity between isocyanate and hydroxyl group is comparatively low, a solution type adhesive diluted in a solvent such as acetate, ketone, ether or aromatic solvent can be used. The adhesive preferably has low viscosity of 5000 cps or less. And, a styrene-butadiene rubber adhesive, epoxy-based bi-liquid type adhesive can also be used. These adhesives preferably have superior storage stability, and superior light permeability of 90% or more at 400~800 nm. In addition, a film wherein a hot melt type adhesive is coated on cyclic olefin-based compensation/protection film can be laminated on a polarizing film using a heating-compression roll.

In order to improve adhesion property, a primer layer can be coated on the surface of cyclic olefin-based compensation/protection film, or corona discharge, plasma treatment, ion beam treatment and the like can be carried out on the surface. And, a tackifying agent can also be used, as long as it shows sufficient adhesion property. It is preferable that the tackifying agent is sufficiently cured by heat or UV after deposition to improve its mechanical property to a level of adhesive, and that the tackifying agent has very large interface adhesion property such that two films between which a tackifying agent is adhered cannot be exfoliated without destruction of any one film.

As the tackifying agent, natural rubber, synthetic rubber or elastomer having superior optical transparency, a vinyl chloridelvinyl acetate copolymer, polyvinyl alkyl ether, polyacrylate, modified polyolefin resin adhesive, and a curable adhesive having a curing agent such as isocyante added thereto, and the like, can be exemplified.

Additionally, since TAC (triacetate cellulose), which is a widely used protection layer for a polarizing film, shows comparatively high moisture absorption, it causes problems of light leakage at high temperature and high humidity, deterioration in polarizing degree, and the like. However, a polarizing plate employing a transparent film prepared from cyclic olefin-based addition polymer as a protection layer of a polarizing film shows more improvement in light leakage at high temperature and high humidity, and in deterioration of polarizing degree than that employing TAC as a protection layer of a polarizing film.

The present invention will be explained in more detail with reference to the following Examples. However, the Examples are only to illustrate the present invention, and the present invention is not limited to them.

EXAMPLES

Preparation 1

Polymerization of Norbornene Carboxylic Acid Methylester

Into a polymerization reactor, norbornene carboxylic acid methylester as monomers and purified toluene were introduced with a weight ratio of 1:1.

Into the reactor, based on the monomers, 0.01 mol % of $Pd(acac)_2$ and 0.01 mol % of tricyclohexylphosphine dissolved in toluene as a catalyst, and 0.02 mol % of dimethylanilinium tetrakiss(pentafluorophenyl)borate dissolved in $CH_2Cl_2$ as a cocatalyst were introduced, and the mixture was reacted while stirring at 80° C. for 20 hours.

After the reaction, the reactant was introduced into excessive ethanol to obtain white copolymer precipitate. The precipitate was filtered using a glass funnel and the recovered copolymer was dried at 65° C. for 24 hours in a vacuum oven to obtain norbornene carboxylic acid methylester (PMeNB).

Preparation 2

Polymerization of Norbornene Carboxylic Acid Butylester

Into a polymerization reactor, norbornene carboxylic acid butylester as monomers and purified toluene as a solvent were introduced with a weight ratio of 1:1.

Into the reactor, based on monomers, 0.01 mol % of Pd(acac)$_2$ and 0.01 mol % of tricyclohexylphosphine dissolved in toluene as a catalyst, and 0.02 mol % of dimethylanilinium tetrakiss(pentafluorophenyl)borate dissolved in CH$_2$Cl$_2$ as a cocatalyst were introduced, and the mixture was reacted while stirring at 80° C. for 20 hours.

After the reaction, the reactant was introduced into excessive ethanol to obtain white copolymer precipitate. The precipitate was filtered using a glass funnel and the recovered copolymer was dried at 65° C. for 24 hours in a vacuum oven to obtain norbornene carboxylic acid butylester (PBeNB).

Preparation 3

Copolymerization of Norbornene Carboxylic Acid Butylester-Norbornene Carboxylic Acid Methylester (Norbornene Carboxylic Acid Butylester/Norbornene Carboxylic Acid Methylester=7/3)

Into a polymerization reactor, norbornene carboxylic acid methylester and norbornene carboxylic acid butylester were introduced in a mole ratio of 3:7, and purified toluene was introduced in a weight ratio of 1:1, on the basis of total monomers.

Into the reactor, based on monomers, 0.01 mol % of Pd(acac)$_2$ and 0.01 mol % of tricyclohexylphosphine dissolved in toluene, and 0.02 mol % of dimethylanilinium tetrakiss(pentafluorophenyl borate) dissolved in CH$_2$Cl$_2$ as a cocatalyst were introduced, and the mixture was reacted while stirring at 80° C. for 20 hours.

After the reaction, the reactant was introduced into excessive ethanol to obtain white copolymer precipitate. The precipitate was filtered with a glass funnel, and the recovered copolymer was dried at 65° C. for 24 hours in a vacuum oven to obtain norbornene carboxylic acid butylester-norbornene carboxylic acid methylester copolymer (PBe-7-Me-3-NB).

Preparation 4

Copolymerization of Norbornene Carboxylic Acid Butylester-Norbornene Carboxylic Acid Methylester (Norbornene Carboxylic Acid Butylester/Norbornene Carboxylic Acid Methylester=5/5)

Into a polymerization reactor, norbornene carboxylic acid methylester and norbornene carboxylic acid butylester were introduced as monomers in a mole ratio of 5:5, and purified toluene was introduced in a weight ratio of 1:1, based on total monomers.

Into the reactor, based on monomers, 0.01 mol % of Pd(acac)$_2$ and 0.01 mol % of tricyclohexylphosphine dissolved in toluene as a catalyst, and 0.02 mol % of dimethylanilinium tetrakis(pentafluorophenyl)borate dissolved in CH$_2$Cl$_2$ as a cocatalyst were introduced, and the mixture was reacted while stirring at 80° C. for 20 hours.

After the reaction, the reactant was introduced into excessive ethanol to obtain white copolymer precipitate. The precipitate was filtered with a glass funnel, and the recovered copolymer was dried at 65° C. for 24 hours in a vaccum oven to obtain norbornene carboxylic acid methylester butylester 5:5 copolymer (PBe-5-Me-5-NB).

Preparation 5

Copolymerization of Norbornene Carboxylic Acid Butylester-Norbornene Carboxylic Acid Methylester (Norbornene Carboxylic Acid Butylester/Norbornene Carboxylic Acid Methylester=3/7)

Into a polymerization reactor, norbornene carboxylic acid methylester and norbornene carboxylic acid butyl ester were introduced in a mole ratio of 7:3 as monomers, and purified toluene was introduced in a weight ratio of 1:1, based on total monomers.

Into the reactor, based on monomers, 0.01 mol % of Pd(acac)$_2$ and 0.01 mol % of tricyclohexylphosphine dissolved in toluene as a catalyst, and 0.02 mol % of dimethylanilinium tetrakis(pentafluorophenyl)borate dissolved in CH$_2$Cl$_2$ was introduced as a cocatalyst, and the mixture was reacted while stirring at 80° C. for 20 hours.

After reaction, the reactant was introduced into excessive ethanol to obtain white copolymer precipitate. The precipitate was filtered with a glass funnel and the recovered copolymer was dried at 65° C. for 24 hours in a vacuum oven to obtain norbornene carboxylic acid butylester methylester 3:7 copolymer (PBe-3-Me-7-NB).

Preparation 6

Copolymerization of Norbornene Carboxylic Acid Methylester-Butyl Norbornene (Norbornene Carboxylic Acid Methylester/Butyl Norbornene=3/7)

Into a polymerization reactor, norbornene carboxylic acid methylester and butyl norbornene were introduced in a mole ratio of 3:7 as monomers, and purified toluene was introduced in a weight ratio of 1:1, based on total monomers.

Into the reactor, based on monomers, 0.01 mol % of Pd(acac)$_2$ and 0.01 mol % of tricyclohexylphosphine dissolved in toluene as a catalyst, and 0.02 mol % of dimethylanilinium tetrakis(pentafluorophenyl)borate dissolved in CH$_2$Cl$_2$ was introduced as a cocatalyst, and the mixture was reacted while stirring at 90° C. for 20 hours.

After reaction, the reactant was introduced into excessive ethanol to obtain white copolymer precipitate. The precipitate was filtered with a glass funnel and the recovered copolymer was dried at 65° C. for 24 hours in a vacuum oven to obtain norbornene carboxylic acid methylester/butyl norbornene 3:7 copolymer (PBu-7-Me-3-NB).

Preparation 7

Copolymerization of Norbornene Carboxylic Acid Methylester-Butyl Norbornene (Norbornene Carboxylic Acid Methylester/Butyl Norbornene=5/5)

Into a polymerization reactor, norbornene carboxylic acid methylester and butyl norbornene were introduced in a mole ratio of 5:5 as monomers, and purified toluene was introduced in a weight ratio of 1:1, based on total monomers.

Into the reactor, based on monomers, 0.01 mol % of Pd(acac)$_2$ and 0.01 mol % of tricyclohexylphosphine dissolved in toluene as a catalyst, and 0.02 mol % of dimethylanilinium tetrakis(pentafluorophenyl)borate dissolved in CH$_2$Cl$_2$ was introduced as a cocatalyst, and the mixture was reacted while stirring at 90° C. for 18 hours.

After reaction, the reactant was introduced into excessive ethanol to obtain white copolymer precipitate. The precipitate was filtered with a glass funnel and the recovered copolymer was dried at 65° C. for 24 hours in a vacuum oven to obtain norbornene carboxylic acid methylester/butyl norbornene 5:5 copolymer (PBu-5-Me-5-NB).

Preparation 8

Polymerization of Acetate Norbornene)

Into a polymerization reactor, acetate norbornene as monomers and purified toluene were introduced in a weight ratio of 1:1.

Into the reactor, based on monomers, 0.03 mol % of Pd(acac)$_2$ and 0.03 mol % of tricyclohexylphosphine dissolved in toluene as a catalyst, and 0.06 mol % of dimethylanilinium tetrakis(pentafluorophenyl)borate dissolved in CH$_2$Cl$_2$ as a cocatalsyt were introduced, and the mixture was reacted while stirring at 80° C. for 17 hours.

After the reaction, the reactant was introduced into excessive ethanol to obtain white copolymer precipitate. The precipitate was filtered with a glass funnel, and the recovered copolymer was dried at 80° C. for 24 hours in a vacuum oven to obtain norbornene acetate polymer (PAcNB).

Examples 1~8

Preparation of a Film

Into the norbornene-based addition polymer prepared in Preparations 1 to 8, Irganox 1010 (Ciba Company) was introduced in an amount of 0.3 wt %, based on the polymer, as an antioxidant, and methylene chloride was introduced as an organic solvent, and a solution with solid content of 20 wt % was prepared. The solution was cast on a band using a band caster (effective length: 8 m, width: 300 mm), dried, and then, exfoliated from the band to obtain a transparent film with thickness deviation within 2%. The film was secondly dried at 100° C. for 4 hours. Then, refractive index (n) was measured using an Abbe refractometer, in-plane phase difference ($R_e$) was measured using an automatic double refractometer (Wangja measuring machine; KOBRA-21 ADH), a phase difference ($R_\theta$) was measured when the angle between the incident light and normal to the film surface is 50°, and phase difference toward film thickness direction ($R_{th}$) were calculated from the following equation 3.

$$R_{th} = \frac{R_\theta \times \cos \theta_f}{\sin^2 \theta_f} \quad \text{[Equation 3]}$$

And, refractive index differences ($n_x - n_y$) and ($n_y - n_z$) were respectively calculated by dividing $R_e$ and $R_{th}$ by a film thickness. The thickness of a transparent film and light transmittance at 400~800 nm are shown in Table 1, and ($n_x - n_y$), $R_\theta$, $R_{th}$, and ($n_y - n_z$) of the transparent film are shown in Table 2.

TABLE 1

|  | Cyclic olefin-based polymer | Physical properties of film | |
|---|---|---|---|
|  |  | thickness(μm) | Light transmittance (%) |
| Example 1 | Polymer of preparation 1, PMeNB | 106 | 92 |
| Example 2 | Polymer of preparation 2, PBeNB | 125 | 91 |
| Example 3 | Polymer of preparation 3, PBe-7-Me-3-NB | 121 | 92 |
| Example 4 | Polymer of preparation 4, PBe-5-Me-5-NB | 116 | 91 |
| Example 5 | Polymer of preparation 5, PBe-3-Me-7-NB | 102 | 92 |
| Example 6 | Polymer of preparation 6, PBu-7-Me-3-NB | 101 | 91 |
| Example 7 | Polymer of preparation 7, PBu-5-Me-5-NB | 102 | 91 |
| Example 8 | Polymer of preparation 8, PAcNB | 103 | 90 |

TABLE 2

|  | polymer | n(refractive index) | $(n_x - n_y) \times 10^3$ | $R_{th}$(nm/μm) | $(n_y - n_z) \times 10^3$ |
|---|---|---|---|---|---|
| Example 1 | Polymer of preparation 1 | 1.52 | 0.02 | 5.69 | 5.69 |
| Example 2 | Polymer of preparation 2 | 1.50 | 0.03 | 2.11 | 2.11 |
| Example 3 | Polymer of preparation 3 | 1.51 | 0.02 | 3.12 | 3.12 |
| Example 4 | Polymer of preparation 4 | 1.51 | 0.02 | 3.38 | 3.38 |
| Example 5 | Polymer of preparation 5 | 1.52 | 0.03 | 4.15 | 4.15 |
| Example 6 | Polymer of preparation 6 | 1.52 | 0.03 | 3.43 | 3.43 |
| Example 7 | Polymer of preparation 7 | 1.51 | 0.02 | 3.78 | 3.78 |
| Example 8 | Polymer of preparation 8 | 1.52 | 0.02 | 5.45 | 5.45 |

And, when $R_\theta$ of the film was measured while overlapped with TAC film satisfying $n_y > n_z$, $R_\theta$ of all the cyclic olefin-based films increased, indicating that $R_{th}$ of cyclic olefin-based film is attributable to negative birefringence ($n_y > n_z$) toward thickness direction. $R_\theta$ of the transparent films obtained in Examples 2~7 at different wavelengts ($\lambda$=479.4 nm, 548 nm, 629 m, 747.7 nm) were measured using an automatic double refractometer (Wangja measuring machine, KOBRA-21, ADH) at an incident angle of 50°. And, $R_{50}(\lambda)/R_{50}(\lambda_o)$, a ratio to $R_\theta$ at a standard wavelength ($\lambda_0$=550 nm) was calculated and shown in Table 3.

TABLE 3

| | Polymer | $R_{50}(479.4)/R_{50}(\lambda o)$ | $R_{50}(548)/R_{50}(\lambda o)$ | $R_{50}(629)/R_{50}(\lambda o)$ | $R_{50}(747.7)/R_{50}(\lambda o)$ |
|---|---|---|---|---|---|
| Film of example 2 | Polymer of preparation 2, PBeNB | 1.007 | 1.000 | 0.998 | 0.987 |
| Film of example 3 | Polymer of preparation 3, PBe-7-Me-3-NB | 1.007 | 1.000 | 1.000 | 0.983 |
| Film of example 4 | Polymer of preparation 4, PBe-5-Me-5-NB | 1.010 | 1.000 | 0.997 | 0.965 |
| Film of example 5 | Polymer of preparation 5, PBe-3-Me-7-NB | 1.008 | 1.000 | 1.000 | 0.992 |
| Film of example 6 | Polymer of preparation 6, PBu-7-Me-3-NB | 1.007 | 1.000 | 0.997 | 0.968 |
| Film of example 7 | Polymer of preparation 7, PBu-5-Me-5-NB | 1.010 | 1.000 | 0.993 | 0.972 |

Examples 9~11

Preparation of Unified Polarizing Plate

On one side of a polarizing film wherein iodine was dyed and oriented on PVA, TAC with a thickness of 80 μm which was surface treated with NaOH was laminated using a PVA aqueous adhesive (3 wt %). Then, one surface of the cyclic olefin-based negative C-plate compensation/protection layer prepared in Examples 2 to 4 was corona discharge treated, and the treated surface side was coated with PVA aqueous adhesive using a Gravia roll coater, and then, laminated to the other side of the polarizing film using a lamination roll, dried at 80° C. for 8 minutes to prepare an oval unified polarizing plate. Corona discharge speed was 2 m/min, treated amount was 0.4 KV·A·min/m², and corona discharge frequency was ~10 KHz, and the distance between an electrode and film was 1.8 mm.

On the non-treated surface of the compensation/protection film of the prepared unified polarizing plate, acrylic adhesive was coated to a thickness of about 30 μm, and adhered perpendicular to a glass plate of 1.2 mm thickness with a size of 40×40 mm. Then, polarizing degree and light permeability at 400~700 nm of the center were measured, and high temperature and high humidity test was carried out at 60° C., 90% RH relative humidity, for 500 hours, and then, changes in light permeability and polarizing degree at center were measured and shown in Table 4.

The unified polarizing plate treated at high temperature high humidity did not show exfoliation, spot, bubbles, or wrinkles. And, the unified polarizing plate showed comparatively small change in birefringence after high temperature high humidity test, and thus non-uniformity according to the location of the sample was little, observed from the front.

TABLE 4

| | | Initial value | | 60° C., 90% RH, after 500 hours | |
|---|---|---|---|---|---|
| | Protection compensation layer | Light transmittance (%) | Polarizing degree (%) | Light transmittance (%) | Polarizing degree (%) |
| Example 9 | Film of Example 2, PBeNB | 43.50 | 99.92 | 43.51 | 99.88 |
| Example 10 | Film of example 3, PBe-7-Me-3 NB | 43.42 | 99.92 | 43.44 | 99.89 |
| Example 11 | Film of Example 4, PBe-5-Me-5 NB | 43.44 | 99.91 | 43.45 | 99.89 |

Comparative Example 1

On one side of the same polarizing film as used in Examples 9 to 11, a surface-treated side of a TAC protection film with a thickness of 80 μm which is surface treated with NaOH solution was laminated using a PVA aqueous adhesive (3 wt %), and on the other side of the polarizing film, the TAC protection film was laminated in the same manner. The laminated film was dried at 80° C. for 8 minutes to obtain a polarizing plate.

The same acrylic adhesive as used in Examples 9 to 11 was coated on a TAC protection film with a thickness of 30 μm, and adhered perpendicular to a glass plate with a thickness of 1.2 mm to a size of 40×40 mm. Light transmittance and polarizing degree at the center were respectively 43.43% and 99.92%. High temperature high humidity test was carried out at 60° C., 90% RH relative humidity, for 500 hours, and light transmittance and polarizing degree were respectively measured to be 43.50% and 99.75%. After the high temperature high humidity test, bad appearance like bubbles, spot, and exfoliation can be observed in some part (especially in edge part) of the sample. In addition to the bad appearance, the sample shows relatively high non-uniformity in color due to the local retardation difference.

According to the unified polarizing plate of the present invention, a conventional process, for optical compensation toward thickness direction, of coating an organic substance such as discotic liquid crystal on a protection layer of a polarizing plate is not required, and a negative C-plate type optical anisotropic compensation/protection film, which can control refractive index toward thickness direction according to the kinds and contents of functional groups introduced into cyclic olefin-based addition polymer, is adhered on at least one side of a polarizing film. Thus, the unified polarizing plate of the present invention has superior durability at high temperature high humidity compared to a polarizing plate employing TAC as a protection layer, and offers improved wide view angle to a liquid crystal display having positive refractive index toward thickness direction when liquid crystal display device is ON or OFF.

What is claimed is:

1. A polarizing plate comprising:
a) a polarizing film; and
b) a protection layer of an unstretched transparent film comprising a cyclic olefin-based addition polymer,
wherein the cyclic olefin-based addition polymer is a homopolymer of the compound represented by the following Chemical Formula 1, or a copolymer of two or more kinds of the compounds represented by the following Chemical Formula 1; and
the transparent film has retardation value ($R_{th}$) of 60 to 1000 nm, calculated by the following equation 1, when the thickness of the transparent film is set to 30 to 200 μm:

$$R_{th} = \Delta(n_y - n_z) \times d \quad \text{[Equation 1]}$$

wherein $n_y$ is a refractive index of in-plane fast axis, measured at a wavelength of 550 nm, $n_z$ is a refractive index toward thickness direction, measured at a wavelength of 550 nm, d is a thickness of the film, and wherein the transparent film is an optically anisotropic film having a refractive index satisfying $n_x \equiv n_y > n_z$ wherein $n_x$ is refractive index of in-plane slow axis, $n_y$ is refractive index of fast axis, and $n_z$ is refractive index toward thickness direction;

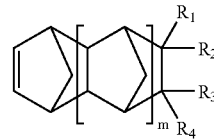

[Chemical Formula 1]

wherein m is an integer of 0 to 4, at least one of $R_1$, $R_2$, $R_3$ and $R_4$ is a polar functional group, the others are non-polar functional group, and $R_1$, $R_2$, $R_3$ and $R_4$ can be bonded together to form an alkylidene group having 1 to 10 carbon atoms, a saturated or unsaturated cyclic group having 4 to 12 carbon atoms, or an aromatic cyclic compound having 6 to 24 carbon atoms, the non-polar functional group is selected from the group consisting of a hydrogen; halogen; straight or branched alkyl, alkenyl or vinyl having 1 to 20 carbon atoms; cycloalkyl having 4 to 12 carbon atoms, substituted or unsubstituted with hydrocarbon; aryl having 6 to 40 carbon atoms, substituted or unsubstituted with hydrocarbon; aralkyl having 7 to 15 carbon atoms, substituted or unsubstituted with hydrocarbon; or alkynyl having 3 to 20 carbon atoms, the polar functional group is selected from the group consisting of linear or branched haloalkyl, haloalkenyl or halovinyl having 1 to 20 carbon atoms; halocycloalkyl having 4 to 12 carbon atoms, substituted or unsubstituted with hydrocarbon; haloaryl having 6 to 40 carbon atoms, substituted or unsubstituted with hydrocarbon; haloaralkyl having 7 to 15 carbon atoms, substituted or unsubstituted with hydrocarbon; haloalkynyl having 3 to 20 carbon atoms; and non-hydrocarbonaceous polar group selected from the group consisting of following formulae, —C(O)OR$_6$, —R$_5$C(O)OR$_6$, —OR$_6$, —R$_5$OR$_6$, —OC(O)OR$_6$, —R$_5$OC(O)OR$_6$, —C(O)R$_6$, —R$_5$C(O)R$_6$, —OC(O)R$_6$, —R$_5$OC(O)R$_6$, —(R$_5$O)$_p$—OR$_6$, —(OR$_5$)$_p$—OR$_6$, —C(O)—O—C(O)R$_6$, —R$_5$C(O)—O—C(O)R$_6$, —SR$_6$, —R$_5$SR$_6$, —SSR$_6$, —R$_5$SSR$_6$, —S(=O)R$_6$, —R$_5$S(=O)R$_6$, —R$_5$C(=S)R$_6$, —R$_5$C(=S)SR$_6$, —R$_5$SO$_3$R$_6$, —R$_5$N=C=S, —NCO, R$_5$—NCO, —CN, —R$_5$CN, —NNC(=S)R$_6$, —R$_5$NNC(=S)R$_6$, —NO$_2$, —R$_5$NO$_2$,

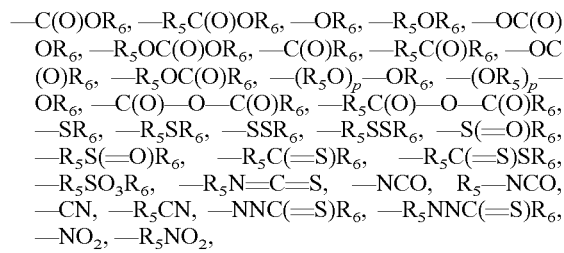

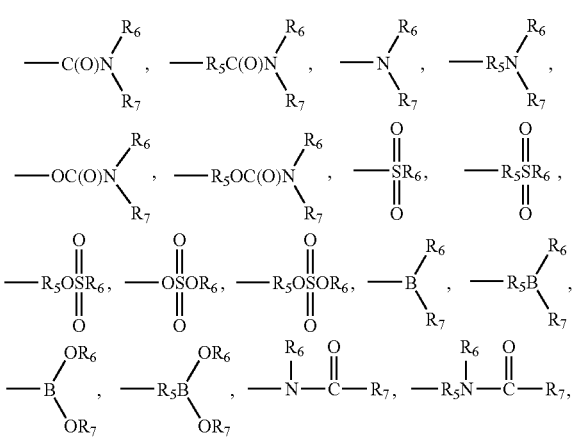

-continued

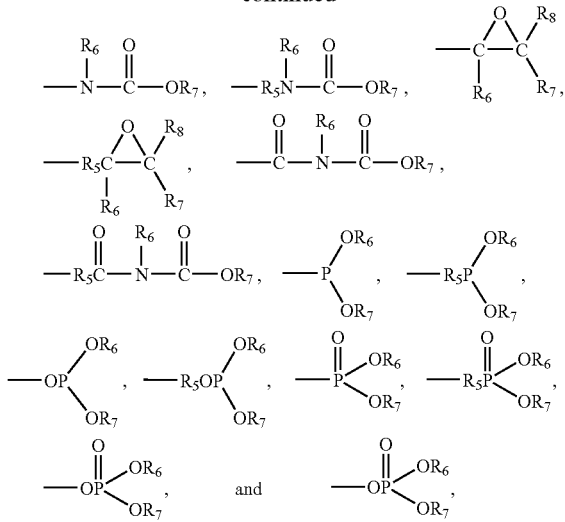

wherein each $R_5$ is a linear or branched alkyl, haloalkyl, alkenyl, haloalkenyl, vinyl, halovinyl having 1 to 20 carbon atoms; cycloalkyl or halocycloalkyl having 4 to 12 carbon atoms, substituted or unsubstituted with hydrocarbon; aryl or haloaryl having 6 to 40 carbon atoms, substituted or unsubstituted with hydrocarbon; aralkyl or haloaralkyl having 7 to 15 carbon atoms, substituted or unsubstituted with hydrocarbon; or, alkynyl or haloalkynyl having 3 to 20 carbon atoms, each of $R_6$ and $R_7$ is a hydrogen; halogen; linear or branched alkyl, haloalkyl, alkenyl, haloalkenyl, vinyl, halovinyl, alkoxy, haloalkoxy, carbonyloxy, halocarbonyloxy having 1 to 20 carbon atoms; cycloalkyl or halocycloalkyl having 4 to 12 carbon atoms, substituted or unsubstituted with hydrocarbon; aryl, haloaryl, aryloxy, or haloaryloxy having 6 to 40 carbon atoms, substituted or unsubstituted with hydrocarbon; aralkyl or haloaralkyl having 7 to 15 carbon atoms, substituted or unsubstituted with hydrocarbon; alkynyl or haloalkynyl having 3 to 20 carbon atoms, and p is an integer of 1 to 10.

2. The polarizing plate according to claim 1, wherein the transparent film is of negative C-plate type.

3. The polarizing plate according to claim 1, wherein the transparent film is laminated on one side of the polarizing film.

4. The polarizing plate according to claim 1, wherein the transparent film is laminated on both sides of the polarizing film.

5. The polarizing plate according to claim 1, wherein the cyclic olefin-based addition polymer further comprises a non-polar functional group.

6. The polarizing plate according to claim 1, wherein the cyclic olefin-based addition polymer is a homopolymer of norbornene-based monomers comprising polar functional group, or a copolymer of norbornene-based monomers comprising different polar functional groups.

7. The polarizing plate according to claim 1, wherein the cyclic olefin-based addition polymer is a copolymer of norbornene-based monomers comprising non-polar functional group and norbornene-based monomers comprising polar functional group.

8. The polarizing plate according to claim 1, wherein the transparent film comprises a blend of one or more kinds of cyclic olefin-based addition polymers.

9. The polarizing plate according to claim 1, wherein the cyclic olefin-based addition polymer is prepared by a method comprising addition polymerizing norbornene-based monomers in the presence of Group 10 transition metal catalyst.

10. The polarizing plate according to claim 1, wherein the cyclic olefin-based addition polymer is prepared by a method which comprise contacting norbornene-based monomers comprising polar functional group with a catalyst component of a catalyst system comprising:
    i) a catalyst component of Group 10 transition metal compound;
    ii) a cocatalyst component of an organic compound that comprises Group 15 element and has noncovalent electron pair capable of functioning as an electron donor; and
    iii) a cocatalyst component of a salt comprising Group 13 element capable of offering an anion that can be weakly coordinated to the transition metal to effect addition polymerization.

11. The polarizing plate according to claim 1, wherein the polarizing plate comprises a transparent optical film prepared from cyclic olefin-based addition polymer comprising polar functional group of ester or acetyl group, which is prepared by a method comprising contacting norbornene-based monomers comprising a polar functional group of ester or acetyl group with a catalyst component of a catalyst system comprising:
    i) Group 10 transition metal compound;
    ii) a compound comprising a neutral Group 15 electron donor ligand having a cone angle of at least 160°; and
    iii) a salt capable of offering an anion that can be weakly coordinated to the i) transition metal to effect addition polymerization.

12. The polarizing plate according to claim 1, wherein the transparent film is prepared by a solution casting which comprises the step of dissolving cyclic olefin-based addition polymer in a solvent and casting the solution into film.

13. The polarizing plate according to claim 1, wherein one or more kinds of surface treatments selected from the group consisting of corona discharge, glow discharge, flam treatment, acid treatment, alkali treatment, UV irradiation, and coating are conducted on the transparent film.

14. A liquid crystal display comprising the polarizing plate described in claim 1.

15. The liquid crystal display according to claim 14, wherein the liquid crystal display comprises liquid crystal cell mode, of which liquid crystal layer has refractive index satisfying $n_x \cong n_y < n_z$, when power of liquid crystal display device is ON or OFF wherein $n_x$ is refractive index of in-plane slow axis, $n_y$ is refractive index of in-plane fast axis, and $n_z$ is refractive index toward thickness direction.

16. A unified polarizing plate comprising an unstretched optically anisotropic transparent film laminated on at least one side of a polarizing film, said optically anisotropic transparent film has retardation value ($R_{th}$) of 60 to 1000 nm, calculated by the following equation 1, phase difference ratio ($R_{450}/R_{550}$) of 1 to 1.05 and ($R_{650}/R_{550}$) of 0.95 to 1 (wherein $R_{450}$ is phase difference value at a wavelength of 450 nm, $R_{550}$ is a phase difference value at a wavelength of 550 nm, and $R_{650}$ is a phase difference value at a wavelength of 650 nm):

$$R_{th} = \Delta(n_y - n_z) \times d \qquad \text{[Equation 1]}$$

wherein, $n_y$ is a refractive index of in-plane fast axis, measured at a wavelength of 550 nm, $n_z$ is a refractive index toward thickness direction, measured at a wavelength of 550 nm, d is a thickness of a film, and wherein the optically anisotropic transparent film has refractive index satisfying $n_x \cong n_y > n_z$ is refractive index of in-plane slow axis, $n_y$ is refractive index of fast axis, and $n_z$ is refractive index toward thickness direction, wherein the optically anisotropic transparent film comprises a homopolymer of the compound represented by the following Chemical Formula 1, or a copolymer of two or more kinds of the compounds represented by the following Chemical Formula 1:

[Chemical Formula 1]

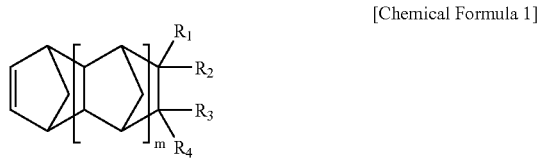

wherein m is an integer of 0 to 4, at least one of $R_1$, $R_2$, $R_3$ and $R_4$ is a polar functional group, the others are non-polar functional group, and $R_1$, $R_2$, $R_3$ and $R_4$ can be bonded together to form an alkylidene group having 1 to 10 carbon atoms, a saturated or unsaturated cyclic group having 4 to 12 carbon atoms, or an aromatic cyclic compound having 6 to 24 carbon atoms, the non-polar functional group is selected from the group consisting of a hydrogen; halogen; straight or branched alkyl, alkenyl or vinyl having 1 to 20 carbon atoms; cycloalkyl having 4 to 12 carbon atoms, substituted or unsubstituted with hydrocarbon; aryl having 6 to 40 carbon atoms, substituted or unsubstituted with hydrocarbon; aralkyl having 7 to 15 carbon atoms, substituted or unsubstituted with hydrocarbon; or alkynyl having 3 to 20 carbon atoms, the polar functional group is selected from the group consisting of linear or branched haloalkyl, haloalkenyl or halovinyl having 1 to 20 carbon atoms; halocycloalkyl having 4 to 12 carbon atoms, substituted or unsubstituted with hydrocarbon; haloaryl having 6 to 40 carbon atoms, substituted or unsubstituted with hydrocarbon; haloaralkyl having 7 to 15 carbon atoms, substituted or unsubstituted with hydrocarbon; haloalkynyl having 3 to 20 carbon atoms; and non-hydrocarbonaceous polar group selected from the group consisting of following formulae, —C(O)OR$_6$, —R$_5$C(O)OR$_6$, —OR$_6$, —R$_5$OR$_6$, —OC(O)OR$_6$, —R$_5$OC(O)OR$_6$, —C(O)R$_6$, —R$_5$C(O)R$_6$, —OC(O)R$_6$, —R$_5$OC(O)R$_6$, —(R$_5$O)$_p$—OR$_6$, —(OR$_5$)$_p$—OR$_6$, —C(O)—O—C(O)R$_6$, —R$_5$C(O)—O—C(O)R$_6$, —SR$_6$, —R$_5$SR$_6$, —SSR$_6$, —R$_5$SSR$_6$, —S(=O)R$_6$, —R$_5$S(=O)R$_6$, —R$_5$C(=S)R$_6$, —R$_5$C(=S)SR$_6$, —R$_5$SO$_3$R$_6$, —SO$_3$R$_6$, —R$_5$N=N=C=S, —NCO, R$_5$—NCO, —CN, —R$_5$CN, —NNC(=S)R$_6$, —R$_5$NNC(=S)R$_6$, —NO$_2$, —R$_5$NO$_2$,

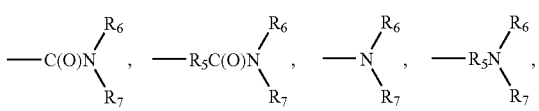

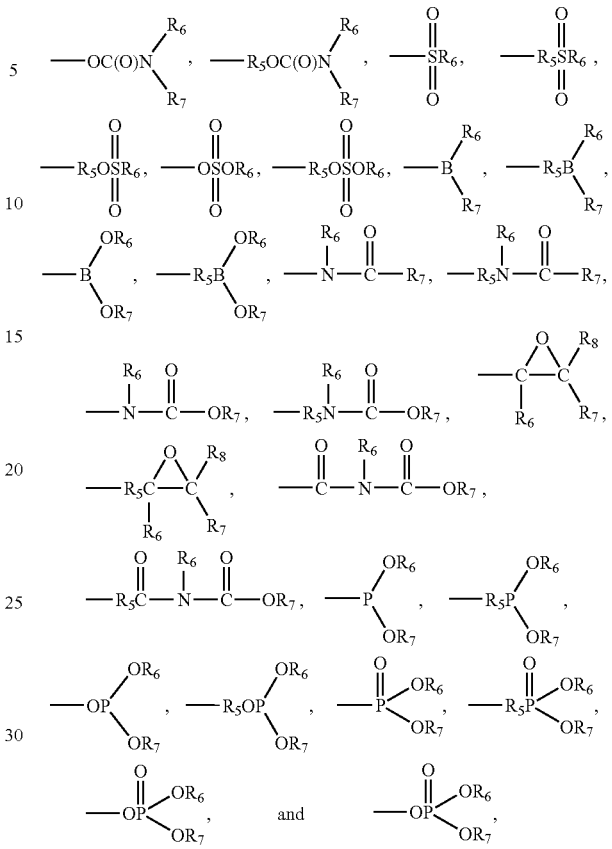

wherein each $R_5$ is a linear or branched alkyl, haloalkyl, alkenyl, haloalkenyl, vinyl, halovinyl having 1 to 20 carbon atoms; cycloalkyl or halocycloalkyl having 4 to 12 carbon atoms, substituted or unsubstituted with hydrocarbon; aryl or haloaryl having 6 to 40 carbon atoms, substituted or unsubstituted with hydrocarbon; aralkyl or haloaralkyl having 7 to 15 carbon atoms, substituted or unsubstituted with hydrocarbon; or, alkynyl or haloalkynyl having 3 to 20 carbon atoms, each of $R_6$ and $R_7$ is a hydrogen; halogen; linear or branched alkyl, haloalkyl, alkenyl, haloalkenyl, vinyl, halovinyl, alkoxy, haloalkoxy, carbonyloxy, halocarbonyloxy having 1 to 20 carbon atoms; cycloalkyl or halocycloalkyl having 4 to 12 carbon atoms, substituted or unsubstituted with hydrocarbon; aryl, haloaryl, aryloxy, or haloaryloxy having 6 to 40 carbon atoms, substituted or unsubstituted with hydrocarbon; aralkyl or haloaralkyl having 7 to 15 carbon atoms, substituted or unsubstituted with hydrocarbon; alkynyl or haloalkynyl having 3 to 20 carbon atoms, and p is an integer of 1 to 10.

17. The unified polarizing plate according to claim 16, wherein the optically anisotropic transparent film has light transmittance of at least 90 % at a wavelength of 400 to 800 nm.

18. The unified polarizing plate according to claim 16, wherein the optically anisotropic transparent film has retardation value ($R_{th}$) of 60 to 1000 nm, calculated by the following equation 1, when the thickness of the optically anisotropic transparent film is set to 30 to 200 μm:

$$R_{th} = \Delta(n_y - n_z) \times d \qquad \text{[Equation 1]}$$

wherein $n_y$ is a refractive index of in-plane fast axis, measured at a wavelength of 550 nm, $n_z$ is a refractive index toward thickness direction, measured at a wavelength of 550 nm, and d is a thickness of the film.

19. The unified polarizing plate according to claim 16, wherein the polarizing plate simultaneously performs functions as a negative C-plate for optical compensation and as a polarizing plate.

20. A method for preparing a polarizing plate having negative refractive index toward thickness direction, comprising the steps of:
   a) conducting addition polymerization of norbornene-based monomers according to the following Chemical Formula 1, to prepare a norbornene-based addition polymer;
   b) dissolving the norbornene-based addition polymer in a solvent to prepare a norbornene-based addition polymer solution;
   c) coating or casting the norbornene-based addition polymer solution on a hard surface and drying to prepare a cast film with retardation value ($R_{th}$) of 60-1000 nm, calculated by the following Equation 1; and
   d) laminating the cast film on a polarizing film $$R_{th}=\Delta(n_y-n_z)\times d \quad \text{[Equation 1]}$$

wherein, $n_y$ is a refractive index of in-plane fast axis, measured at a wavelength of 550 nm, $n_z$ is a refractive index toward thickness direction, measured at a wavelength of 550 nm, d is a thickness of a film, and wherein the cast film is an optically anisotropic film having a refractive index satisfying $n_x \cong n_y > n_z$ wherein $n_x$ is refractive index of in-plane slow axis, $n_y$ is refractive index of fast axis, and $n_z$ is refractive index toward thickness direction;

[Chemical Formula 1]

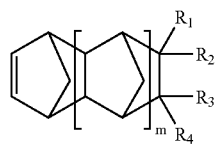

wherein m is an integer of 0 to 4, at least one of $R_1$, $R_2$, $R_3$ and $R_4$ is a polar functional group, the others are non-polar functional group, and $R_1$, $R_2$, $R_3$ and $R_4$ can be bonded together to form an alkylidene group having 1 to 10 carbon atoms, a saturated or unsaturated cyclic group having 4 to 12 carbon atoms, or an aromatic cyclic compound having 6 to 24 carbon atoms, the non-polar functional group is selected from the group consisting of a hydrogen; halogen; straight or branched alkyl, alkenyl or vinyl having 1 to 20 carbon atoms; cycloalkyl having 4 to 12 carbon atoms, substituted or unsubstituted with hydrocarbon; aryl having 6 to 40 carbon atoms, substituted or unsubstituted with hydrocarbon; aralkyl having 7 to 15 carbon atoms, substituted or unsubstituted with hydrocarbon; or alkynyl having 3 to 20 carbon atoms, the polar functional group is selected from the group consisting of linear or branched haloalkyl, haloalkenyl or halovinyl having 1 to 20 carbon atoms; halocycloalkyl having 4 to 12 carbon atoms, substituted or unsubstituted with hydrocarbon; haloaryl having 6 to 40 carbon atoms, substituted or unsubstituted with hydrocarbon; haloaralkyl having 7 to 15 carbon atoms, substituted or unsubstituted with hydrocarbon; haloalkynyl having 3 to 20 carbon atoms; and non-hydrocarbonaceous polar group selected from the group consisting of following formulae,

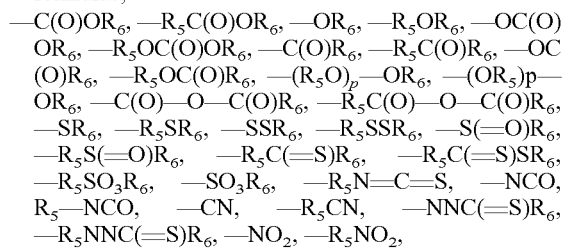

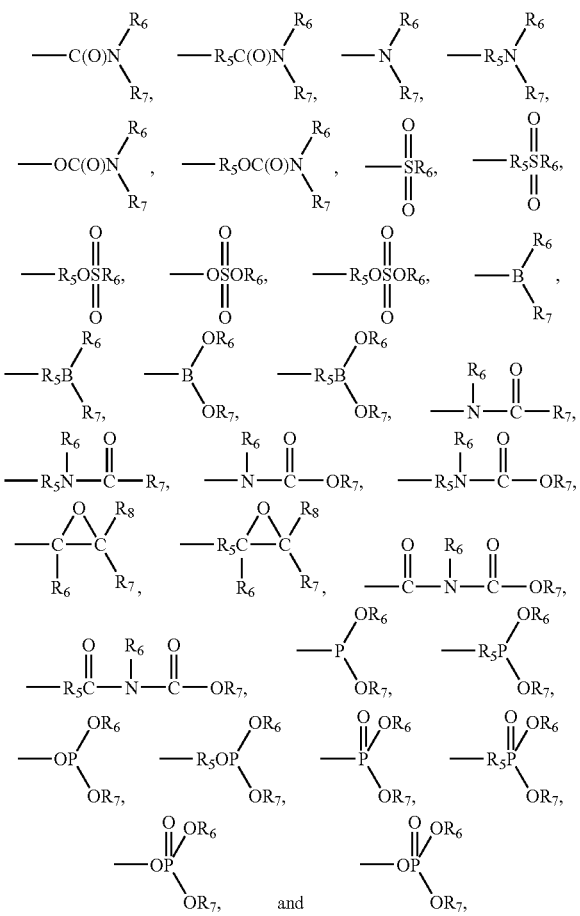

wherein each $R_5$ is a linear or branched alkyl, haloalkyl, alkenyl, haloalkenyl, vinyl, halovinyl having 1 to 20 carbon atoms; cycloalkyl or halocycloalkyl having 4 to 12 carbon atoms, substituted or unsubstituted with hydrocarbon; aryl or haloaryl having 6 to 40 carbon atoms, substituted or unsubstituted with hydrocarbon; aralkyl or haloaralkyl having 7 to 15carbon atoms, substituted or unsubstituted with hydrocarbon; or, alkynyl or haloalkynyl having 3 to 20 carbon atoms, each of $R_6$ and $R_7$ is a hydrogen; halogen; linear or branched alkyl, haloalkyl, alkenyl, haloalkenyl, vinyl, halovinyl, alkoxy, haloalkoxy, carbonyloxy, halocarbonyloxy having 1 to 20 carbon atoms; cycloalkyl or halocycloalkyl having 4 to 12 carbon atoms, substituted or unsubstituted with hydrocarbon; aryl, haloaryl, aryloxy, or haloaryloxy having 6 to 40 carbon atoms, substituted or unsubstituted with hydrocarbon; aralkyl or haloaralkyl having 7 to 15 carbon atoms, substituted or unsubstituted with hydrocarbon; alkynyl or haloalkynyl having 3 to 20 carbon atoms, and p is an integer of 1 to 10.

21. The method according to claim 20, wherein the lamination in the step d) is conducted after conducting surface treatment of the cast film selected from the group consisting of corona discharge, glow discharge, flame treatment, acid treatment, alkali treatment, UV irradiation and coating.

22. The method for preparing a polarizing plate according to claim 20, wherein the polarizing plate comprises a protection layer placed on one side or both sides of the polarizing film.

* * * * *